United States Patent
Furman

[11] Patent Number: 5,899,167
[45] Date of Patent: May 4, 1999

[54] DISPLAY SUPPORT DEVICE FOR DISPLAYING REPLACEABLE INDICIA

[76] Inventor: Shulim Furman, 1903 Bonaventure Way, Marietta, Ga. 30068

[21] Appl. No.: 08/909,038

[22] Filed: Aug. 11, 1997

[51] Int. Cl.[6] .............................. G09F 17/00; F16C 11/06
[52] U.S. Cl. ........................ 116/173; 116/309; 403/115; 403/143; 248/516
[58] Field of Search ..................................... 116/173, 174, 116/309, 28 R, 63 P, 63 R; 403/57, 74, 122, 114, 115, 141, 143, 128, 131; 248/515, 516, 521, 530; 40/606, 591, 592

[56] References Cited

U.S. PATENT DOCUMENTS

| | | | |
|---|---|---|---|
| 230,521 | 7/1880 | Barker | 248/516 |
| 840,241 | 1/1907 | Nootbaar | 248/515 |
| 3,409,317 | 11/1968 | Richards | 403/128 |
| 3,424,419 | 1/1969 | Siegel | 403/143 |
| 3,540,406 | 11/1970 | Dexter | 116/173 |
| 3,762,360 | 10/1973 | Hawes | 116/173 |
| 5,247,900 | 9/1993 | Sobecak | 116/173 |
| 5,374,024 | 12/1994 | Williams | 116/173 |
| 5,483,916 | 1/1996 | Kolvites et al. | 116/173 |

*Primary Examiner*—Diego Gutierrez
*Assistant Examiner*—Andrew Hirshfeld
*Attorney, Agent, or Firm*—Eric R. Katz

[57] ABSTRACT

A display support device for displaying flags and banners comprises a base having a cavity; a shaft attached to a rotatable member received by the cavity for rotation freely in all directions; and a clamping arrangement for clamping the rotatable member against the cavity of the base to prevent relative movement therebetween. This attachment arrangement employs a plunger, positioned for movement along the longitudinal axis of the base, which is forced out of the bottom of the base by the rotatable member pressing against the bottom wall of the cavity of the base under the action of the clamping arrangement. The plunger, when the display support device is loosely clipped or strapped to the disparate object, acts to tighten the clip or strap so as to clasp the display support device to the disparate object, regardless of the surface irregularity of the object.

19 Claims, 11 Drawing Sheets

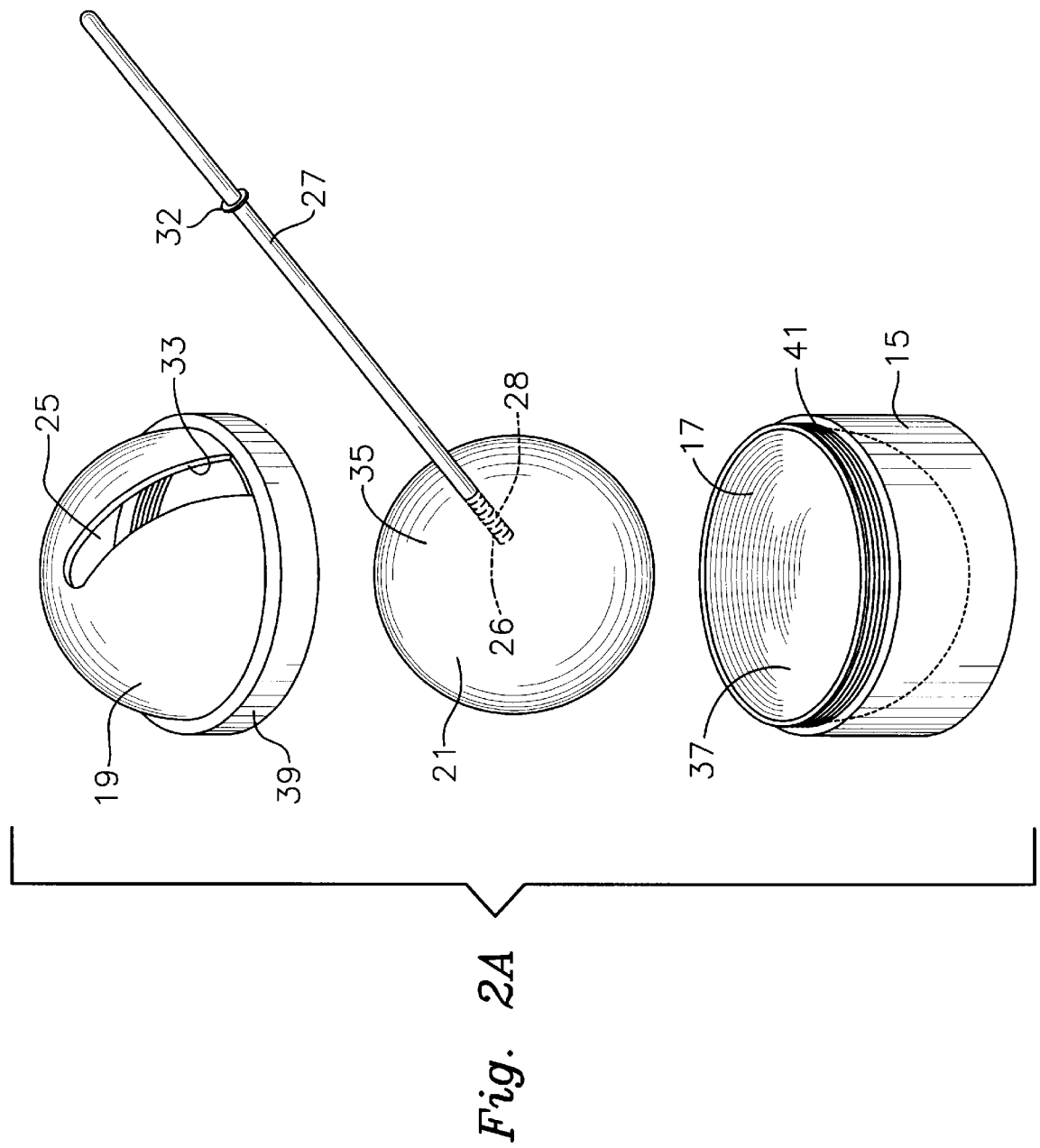

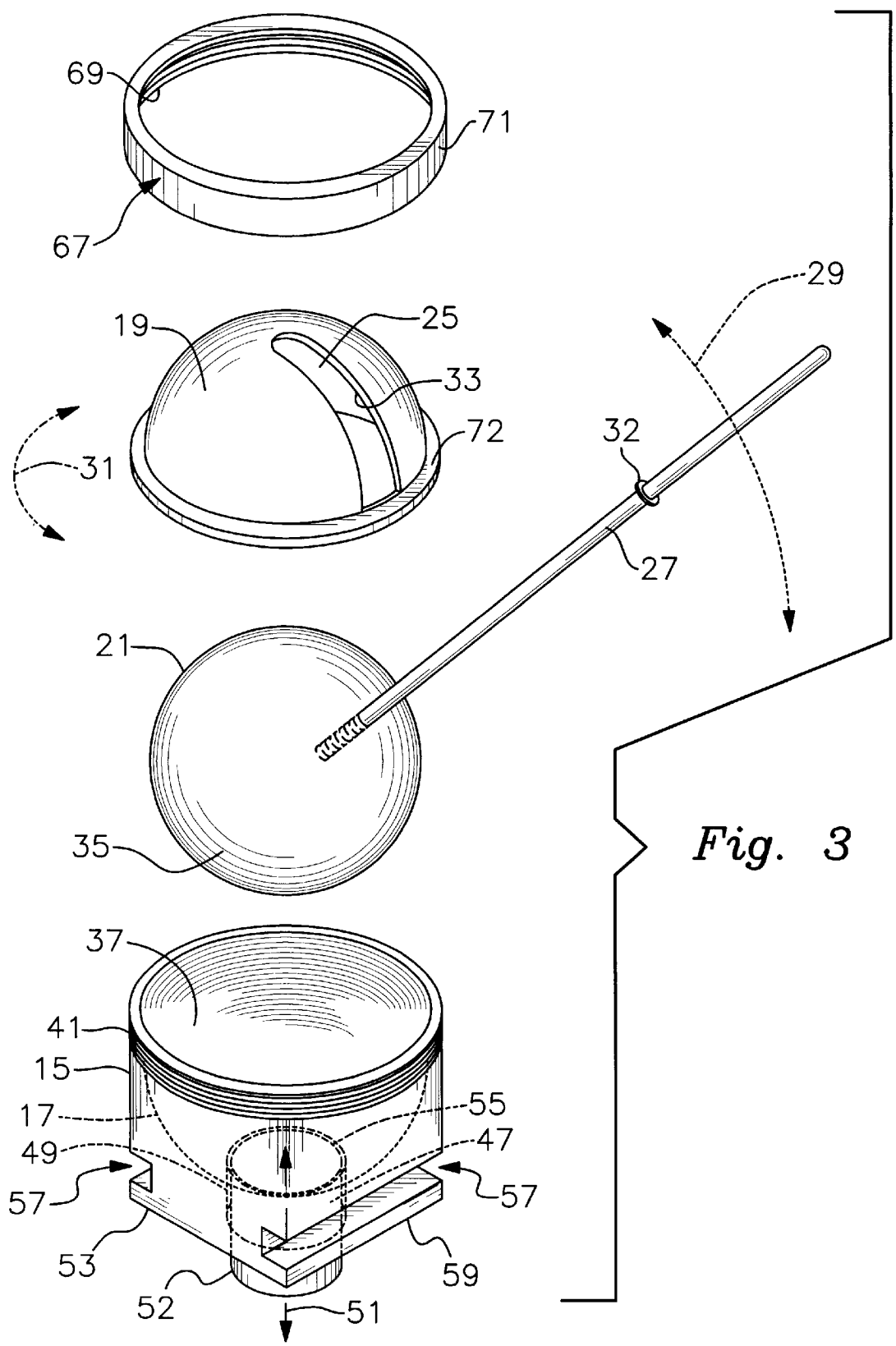

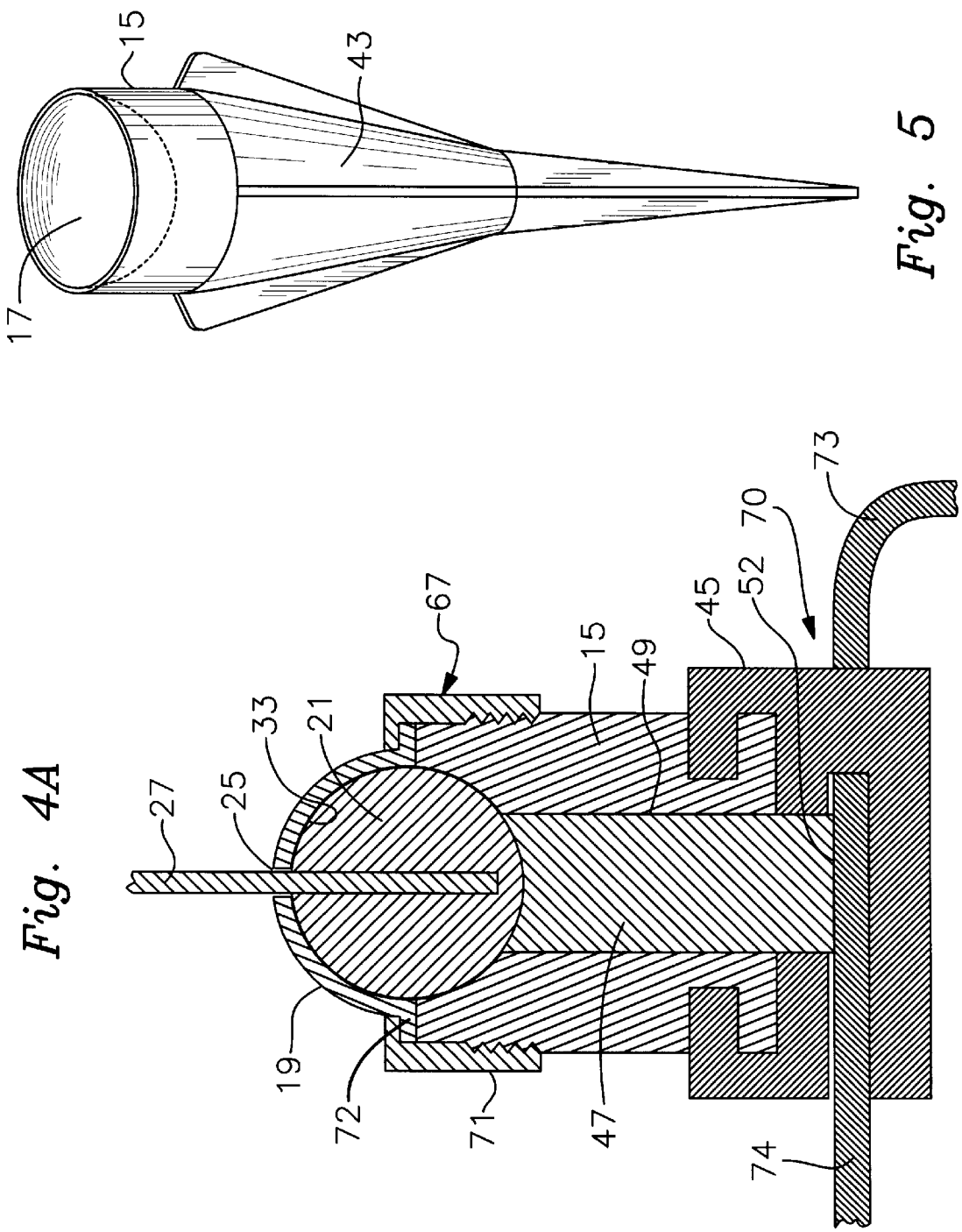

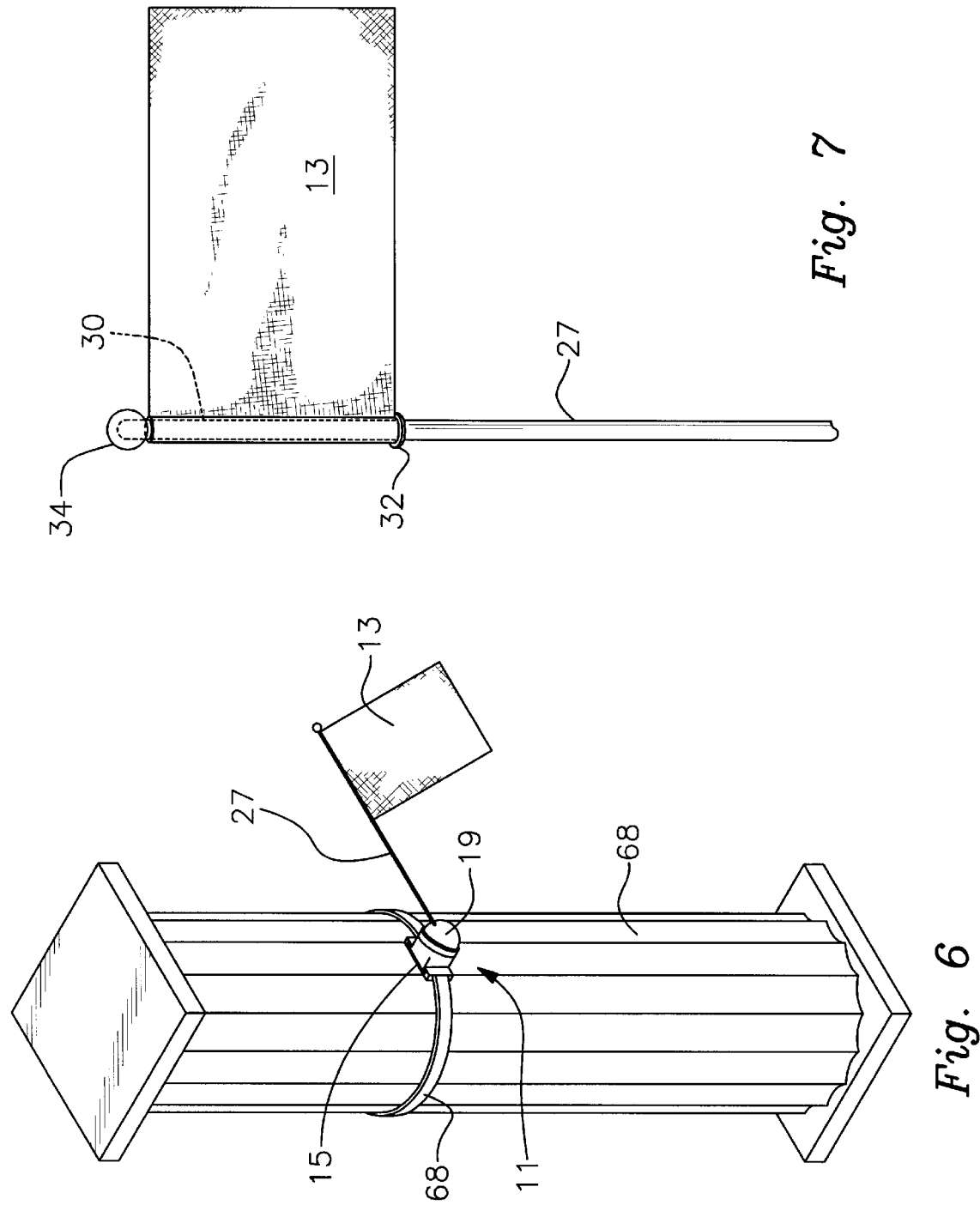

DISPLAY SUPPORT DEVICE FOR DISPLAYING REPLACEABLE INDICIA

FIELD OF THE INVENTION

The present invention generally relates to a modular display support system adaptable for attachment to miscellaneous articles having dissimilar surface features, and more particularly, to a display support device for displaying replaceable indicia, such as pennants, banners and flags, on a pole or shaft which is capable of being adjustably fixed at any selected angular position relative to a single point of free rotation and supported on the surface of almost any type of structure, both stationary and mobile.

BACKGROUND

Different mounting arrangements for the display of flags, sports pennants and banners are known such as wall brackets, lawn or sidewalk sockets, floor stands, flag and banner poles for indoor and parade use as well as outdoor flag poles and the like. In addition, it is known to display flags and placards on personal vehicles for a diversity of reasons, such as, to express support for a sports team, mark the location of the vehicle in a parking lot, request emergency assistance, signal distress as well as for decorative and symbolic purposes. Known arrangements for supporting flags on automobiles are disclosed by U.S. Pat. Nos. D295,730, 3,036,545, 4,015,557, 4,163,426, 4,348,978, 4,519,153, 4,875,431, 4,964,360, 5,233,938, and 5,299,525.

One particular drawback of the known arrangements noted above is that each is adapted for only one distinctive function and cannot be affixed to disparate supporting structures having different surface irregularities. An addition deficiency is that these known arrangements typically orient the flag on a pole which is fixed against movement relative to a base structure thereby preventing angular adjustment of the flag pole. One exception is the wall mounted bracket, however, these brackets permit the angular adjustment of a flag pole relative to the base in only one, restricted, plane around a single shaft of rotation. Moreover, many of the known arrangements employ complex support structures and are expensive.

SUMMARY OF THE INVENTION

Accordingly, it is an object of the present invention to provide a display support device for displaying changeable indicia, such as pennants, banners, flags, on a pole or shaft which overcomes the deficiencies of the prior art approaches.

It is a further object of the present invention to provide a display support device which is capable of freely positioning the display pole about a single, unrestricted, point of rotation on different structures, both stationary and mobile, having dissimilar surface features.

Still another object of the present invention is to provide a display support device which is relatively simple in structure and inexpensive to manufacture.

These and other objects, advantages and features of the present invention are achieved, according to one embodiment of the present invention, by a display support device for displaying changeable planar sheet material having indicia, the display support device comprising: a base having a cavity, the base being attachable to a miscellaneous object; a shaft attached to a rotatable member received by the cavity for rotation freely in all directions; and a clamp for clamping the rotatable member against the cavity of the base to prevent relative movement therebetween.

According to another embodiment of the present invention, the display support device further includes a special adaptable attachment for attaching the device to almost any object, such as, for example, around poles having any type of cross-sectionally configuration, and to vehicles such as automobiles bicycles, boats and the like. This attachment takes the form of a strap or clip arrangement which is removably attached to the base. The base of the display support device is further provided with a moveable plunger which is adapted for movement along a longitudinal axis of the base. One of the plunger forms the bottom wall of the cavity of the base and the other end of the plunger is provided with, for example, a soft pad for contacting, in a non-slip manner, the disparate object.

Under the action of the clamping arrangement, the padded bottom portion of the plunger is forced away from the bottom of the device by means of the rotatable member pressing against that portion of the plunger which forms the bottom wall of the cavity of the base. Therefore, the plunger, when the display support device and the attachment combination is loosely clipped or strapped to the disparate object, acts to tighten the clip or strap so as to clasp the display support device to the disparate object, regardless of the surface irregularity of the object.

According to yet another embodiment of the present invention, there is utilized a unique strap attachment arrangement which cooperates with the display support device to attach the device to a disparate object, wherein the display support device comprises: a hollow shell forming a cavity; a shaft attached to a rotatable member received by the cavity for rotation freely in all directions; a plunger which has one end that abuts the rotatable member and an other end which contacts a disparate object; and a strap, attached to the hollow shell, which, when tightened around the disparate object, pulls the hollow shell against the rotatable member which is restricted by the plunger in contact with the disparate object to thereby clamp the rotatable member against the inside of the cavity to prevent relative movement therebetween and to attach the display support device to the disparate object.

One particular advantageous feature of the present invention is that in all the embodiments thereof, the rotatable member and cavity of the base form a ball-and socket joint to permit free movement of the flag shaft in all directions in at least a hemisphere about a single point of rotation.

Another advantageous feature of the present invention is the provision of a rigid tube which forms an integral portion the replaceable flag or indicia to be displayed wherein the replaceable flag is positioned on the device by sliding the rigid tube of the flag onto the shaft. The shaft is provided with a stop on which one end of the tube rests to position the flag on the shaft at the desire position and a clip for attachment to the end of the shaft to retain the tube between the stop and the clip to keep the flag from coming off the shaft.

Further advantageous features of the present invention include the ability of the display device to be used for a number of different purposes including a vehicle locator, a flag or banner support, a distress signal as well as to display information for advertisement or notice requirement.

Still another advantageous feature of the present invention is that it is adapted for attachment to a wide variety of disparate objects with greatly differing surface features, such as around or atop poles of any cross-sectional configuration, parade poles, parade belts, sidewalks, lawns, walls, automobiles, boats, motorcycles, bicycles and the like.

BRIEF DESCRIPTION OF THE DRAWINGS

FIG. 2A is an exploded view of the embodiment of FIG. 1 illustrating the elements of the present invention;

FIG. 4A is a side-view, in section, of a further embodiment of the attachment shown in FIG. 3 wherein the attachment is a spring clip adapted for affixing the display support device to an object having a flange edge such as an automobile;

FIG. 5 illustrates the present invention mounted on a lawn spike;

FIG. 6 is a perspective view illustration of the display support device attached by an attachment to a fluted column;

FIG. 7 illustrates an arrangement for attaching a flag to the shaft;

DETAILED DESCRIPTION OF THE PREFERRED EMBODIMENT(S)

Figure 1:
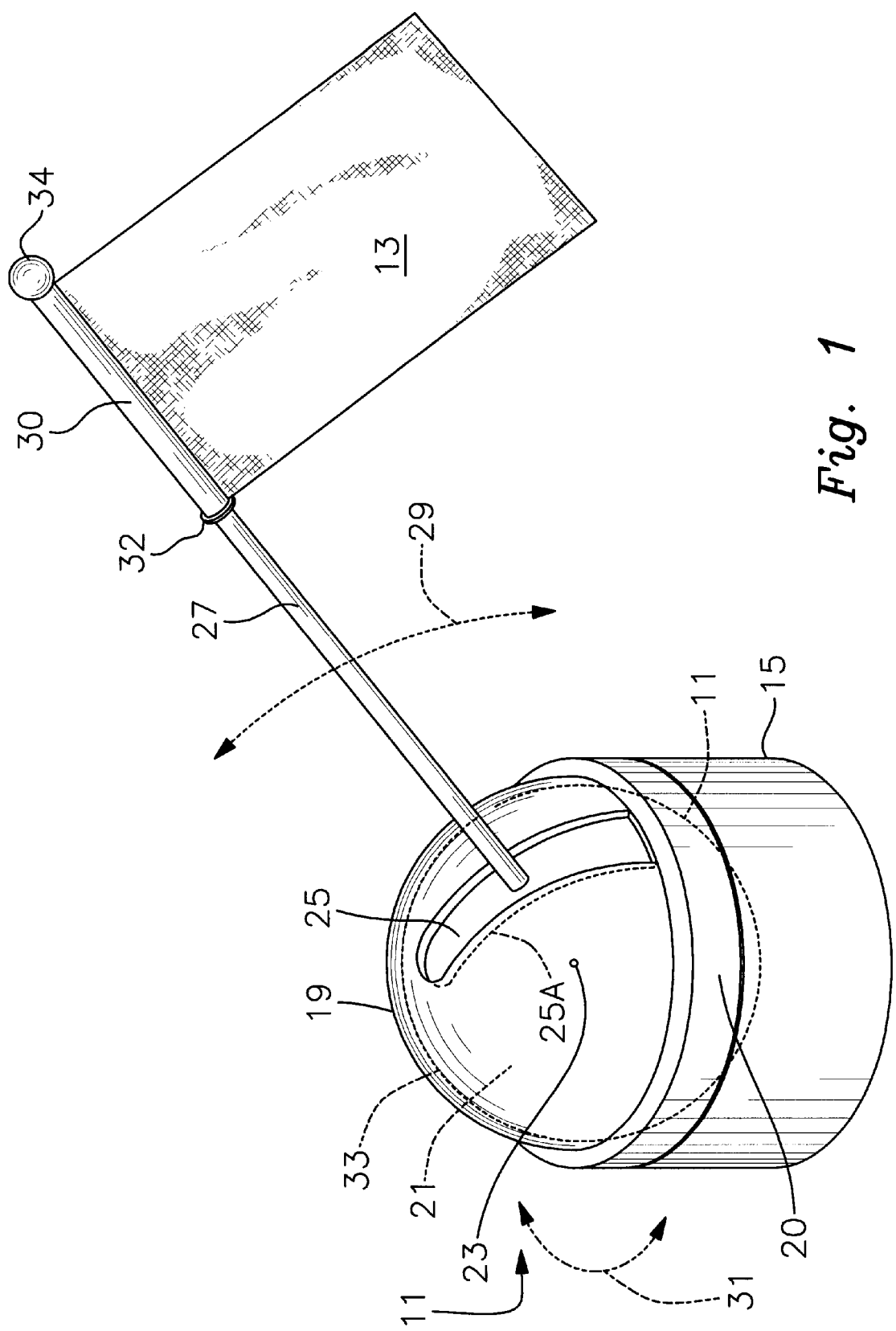
FIG. 1 is a perspective view illustrating one embodiment of the display support device of the present invention.

Referring to FIGS. 1 and 2A, one embodiment of the display support device of the present invention is illustrated, generally at 11, for displaying a planar sheet material 13, such as a pennant, banner, flag or the like. In order to assure that the display support device 11 is resistant to high temperatures, the various components thereof, except for the tubular portion 30 as discussed below, are preferably made of a high density plastic material, such as, for example, polyethylene with filler(s) or the like.

In the embodiment of FIG. 1, display support device 11 comprises a base 15 having a bowl-like basin 17 and a hollow shell 19 which is rotatably mounted relative to the base 15 and adapted for removable attached thereto. The hollow shell 19, with the bowl-like basin 17 of the base 15, a cavity 20. A rotatable member 21 is positioned in the cavity 20 for rotation in all directions about a single point of rotation 23. The shell 19 is provided with a slot 25, which is reinforced around its periphery 25A by increasing the thickness of the high density plastic material comprising the shell 19. A shaft 27, which according to the present embodiment has a substantially constant diameter, is attached to the rotatable member 21 and extends through the slot 25. The shaft 27 is made of any suitable material, such as, for example, fiber glass, metal, wood or the like.

The shaft 27 is glued to the rotatable member 21 or formed integral therewith or removably attached thereto by means of a force fitting arrangement between shaft 27 and a hole 26 in rotatable member 21. Alternatively, threads 28 are provided on shaft 27 which cooperate with complementary threads of hole 26 in rotatable member 21, as best seen in FIG. 2. Further, a tap screw (not shown), positioned substantially perpendicular to the longitudinal axis of the shaft 27 and screwed against a side of the shaft 27 can also be used to hold the shaft 27 in hole 26.

As best seen in FIGS. 1 and 7, the planar sheet material or flag 13 is displayed on the shaft 27. The flag 13 is attached to shaft 27 using a unique arrangement by providing the flag 13 with a rigid tubular-like portion 30 through which the shaft 27 is inserted. The tubular portion 30 is made of a substantially straight tubular piece of plastic material, such as, for example, polypropylene and is preferable formed as an integral part of the flag 13 such as, for example, by wrapping the flag 13 around the tubular portion 30 and gluing the flag 13 and tubular portion 30 together to form one unit. Also, the diameter of the tubular portion 30 is selected to be substantially equal and slightly bit larger than the diameter of the shaft 27 so that the flag 13 is free to rotate on the shaft 27, but there is only a small space between the shaft 27 and tubular portion 30.

A stop 32 on shaft 27 abuts the bottom edge of the tubular portion 30 of the flag 13 and a cap or spring clip 34 which is removably affixed to the terminal end of the shaft 27 retains the flag 13 on the shaft 27.

As will be more fully described hereinafter, the device 11 farther includes a clamping arrangement for clamping the rotatable member 21 against an interior wall of the cavity 20 to prevent relative movement between the base 15 and the rotatable member 21. However, prior to the clamping operation, the rotatable member 21 is freely rotatable in the cavity 20 about the point of rotation 23, the only restriction being the provision of the shaft 27 extending through the slot 25 of the shell 19. Therefore, the angular position of the shaft 27 relative to the base 15 can be adjusted by movement back or forth along the slot 25, as indicated by arrow 29, in at least a hemisphere extending above the upper edge of the base 15. In addition, the shell 19 can be rotated 360 degrees relative to the base 15, as indicated by arrow 31. As a result, the shaft 27 can be freely moved to any desired angular position about the point of rotation 23 as the base 15 remains stationary.

According to the embodiment illustrated by FIGS. 1 and 2A, the clamping arrangement for clamping the rotatable member 21 against rotation relative to the base 15 comprises sizing the cavity 20 so that when the shell 19 is completely attached to the base 15 at least a portion of an internal wall 33 of the shell 19 presses against an external surface 35 of the rotatable member 21 to force the rotatable member 21 against a cavity wall 37 of the bowl-like basin 17 of the base 15. As a result, the rotatable member 21 is clamped against the cavity wall to prevent relative movement between the rotatable member 21 and the base 15.

In order to attach the shell 19 to the base 15, the shell 19 is provided with, for example, a threaded portion 39 which can be threaded on to a corresponding threaded portion 41 of the base 15. As the shell 19 is threaded on to the base 15, the size of the cavity 20 decreases to create the clamping arrangement described above. Once the shaft 27 is fixed in place, the base 15 is attached to a disparate object. In the embodiment of FIGS. 1 and 2A, the base can be formed as part of a lawn spike 43 as shown in FIG. 5 or a floor stand (not shown) as well as a pole for parades and the like. Furthermore, the bottom of the base 15 can be provided as part of a parade belt or the like, in which case it is preferred to eliminate the provision of a clamping arrangement and permit the rotatable member 21 to be freely rotatable in the cavity 20. Moreover, the bottom of the base 15 can be provided with a suction cup (not shown) or adhesive.

Figure 2B:
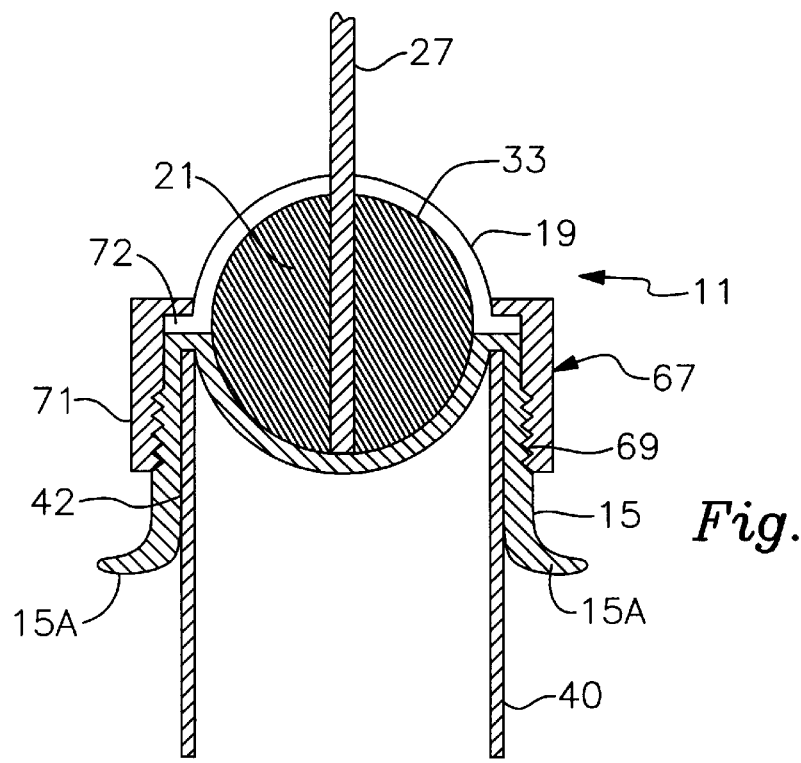
FIG. 2B is a side-sectional view of a variation of the embodiment of FIG. 1 particularly adapted to attachment to the top of a hollow pole or post.

Referring to FIG. 2B, an arrangement of the display support device 11 is shown for attachment to the top of a pole or colon 40, of any cross-sectional configuration. In the arrangement of FIG. 2B, the base 15 is provided with a hollow opening 42 having the same cross-sectional configuration as the pole 40 so that the device is inserted over the top of the pole 40 as shown in FIG. 2B. To assist in putting the base 15 on the top of the pole 40, the base 15 is provided with outwardly extending flanges 15a. These flanges 15a are formed, for example, by cutting the base at selected positions about the circumference thereof.

In the embodiment of FIG. 2B, the clamping arrangement comprises a threaded ring, at 67, having threads 69 on an interior surface of circular flange 71. The ring 67 fits over the shell 19 and has a length such that is fits over at least a portion of the pole 40 so that when the ring 67 is screwed onto the corresponding threads of base 15, the ring 67 grips at least a portion of pole 40 to hold the device 11 on the top of the pole 40. In addition, a rim 72 of the shell 19 is clamped between the ring 67 and the base 15 as best seen in FIGS. 2B and 4 so as to hold the shell 19 stationary with respect to the base 15. Prior to the clamping operation, the rotatable member 21 is freely rotatable in the cavity 20 and the shell 19 is rotatable relative to the base as indicated by arrow 31 of FIG. 1. Therefore, the angular position of the shaft 27 relative to the base 15 can be adjusted to any desired angular position about the point of rotation 23 as the base 15 remains stationary and then is clamped in place.

Figure 2C:
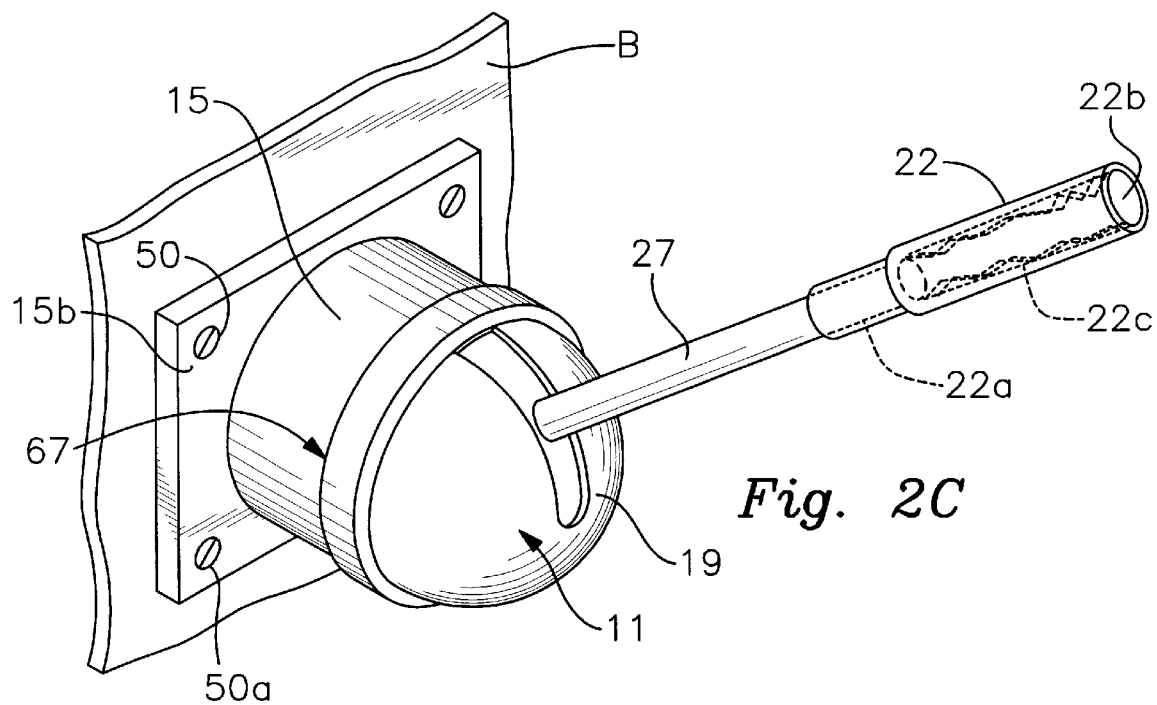
FIG. 2C is a side, perspective view of yet another variation of the embodiment of FIG. 1 particularly adapted for attachment to a wall and farther illustrating a flag staff adapter for permitting the mounting of flag poles of differing diameter on the shaft.

FIG. 2C illustrates yet another embodiment of the device 11 configured for attachment to a wall B. As shown in FIG. 2C, the base is provided with a flat portion 15b which has holes 50 for receiving suitable fasteners or anchors 50a which attach the base 15 to the wall B. The device 11 is shown with a flag staff adapter 22 for accommodating flag staffs (not shown) having diameters different than the diameter of shaft 27. The flag staff adapter 22 is provided with a sleeve 22a which receives shaft 27. A barrel portion 22b receives the flag staff having, for example, a diameter greater than that of shaft 27, the flag staff being held within the barrel 22b by springs 22c, for example, leaf springs.

Figure 3A:
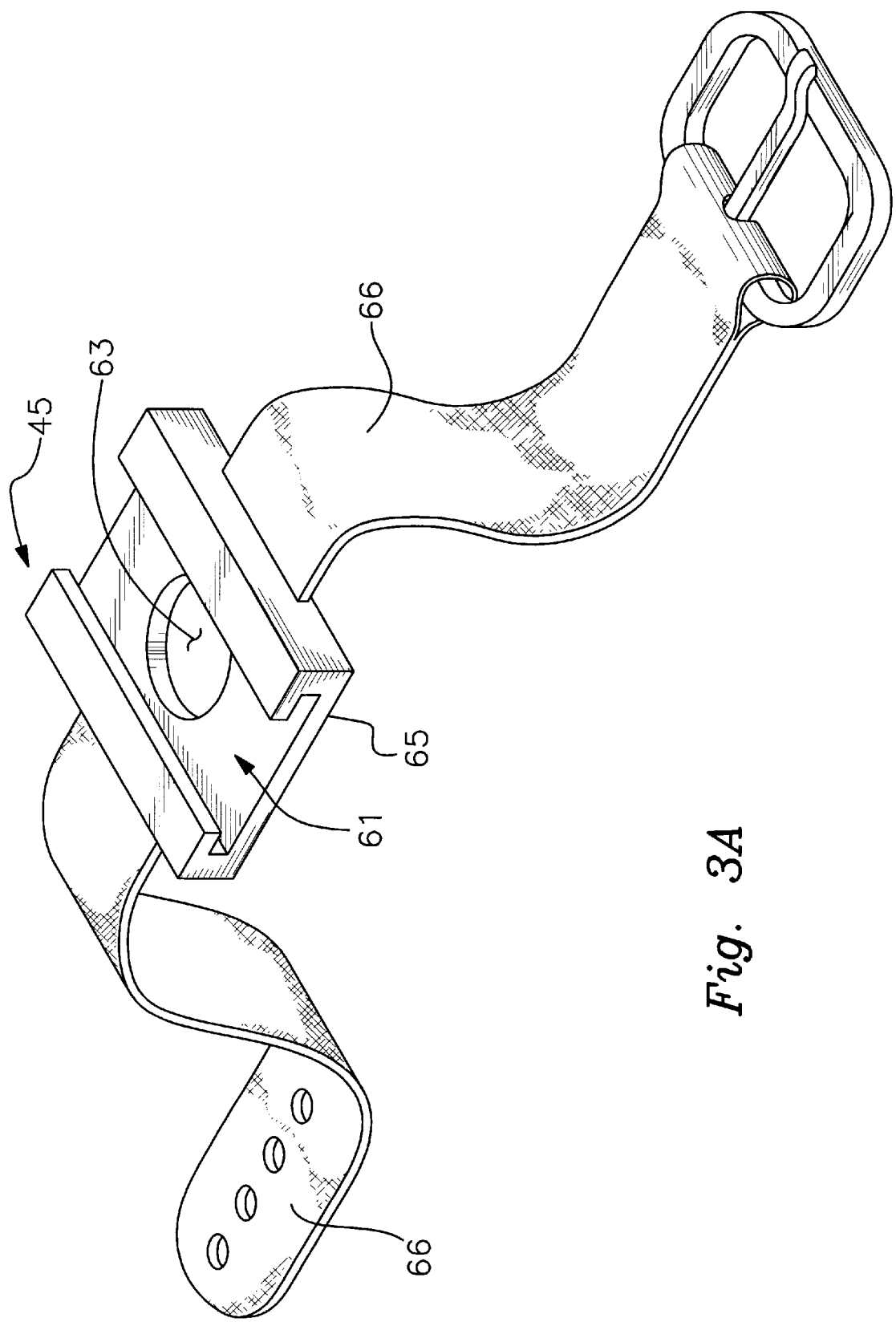
FIG. 3 is an exploded view of a further embodiment of the present invention which is modified to cooperate with an attachment for affixing the display support device to disparate objects.

In the embodiment of FIG. 3, the device 11 is further adapted for use with an attachment 45 which is used to affix the device 11 to disparate articles having different surface features wherein the base 15 is provided with a plunger 47 which is movable in a cylindrical opening 49 extending along a longitudinal axis 51 of the base 15. The plunger 47 comprises a hollow or solid cylinder or the like having a length such that at least a bottom portion 52 of the plunger 47 extends beyond a bottom 53 of the base 15 when the peripheral edge 55 of the plunger 47 is flush with the cavity wall 37 of the bowl-like depression 17.

The base 15 is further provided with grooves along opposite lateral sides, generally indicated at 57, which form projections 59 adapted to be slidably received by, for example, t-shaped slot 61 of the attachment 45. The attachment 45 is also provided with a hole 63 for receiving plunger 47 to permit the bottom portion 52 of the plunger 47 to extend beyond a bottom side 65 of the attachment 45.

In the embodiment of FIG. 3, the clamping arrangement for clamping the rotatable member 21 against an interior wall of the cavity 20 further comprises a threaded ring, at 67, having threads 69 on an interior surface of circular flange 71. The ring 67 fits over the shell 19 and when the ring 67 is screwed onto the threads 41 of base 15, a rim 72 of shell 19 is clamped between the ring 67 and the base 15 as best seen in FIG. 4. Prior to the clamping operation, the rotatable member 21 is freely rotatable in the cavity 20 and the shell 19 is rotatable relative to the base as indicated by arrow 31. Therefore, the angular position of the shaft 27 relative to the base 15 can be adjusted to any desired angular position about the point of rotation 23 as the base 15 remains stationary.

As noted above with regard to the embodiment illustrated by FIG. 1, the clamping arrangement utilizes sizing the cavity 20 relative to the size of the rotatable member 21 so that when the shell 19 is completely attached to the base 15 at least a portion of an internal wall 33 of the shell 19 presses against an external surface 35 of the rotatable member 21 to force the rotatable member 21 against a cavity wall 37 of the bowl-like basin 17 of the base 15. As a result, the rotatable member 21 is clamped against the cavity wall to prevent relative movement between the rotatable member 21 and the base 15.

Since the base 15 is now provided with a longitudinally moveable plunger 47, the clamping operation also works to force the external surface 35 of rotatable member 21 against the peripheral edge 55 of the plunger 47 causing the plunger 47 to move along the longitudinal axis 51 in the direction of the base 15 so that bottom portion 52 of the plunger 47 moves away from the bottom side 53 of base 15. When the device 11 is slid into the attachment 45 and the plunger 47 is aligned with the hole 63 located in the t-shaped slot 61, the plunger 47 has a length such that the bottom portion 52 extends beyond the bottom surface 65 of the attachment 45.

According to the embodiment of FIG. 3, the attachment 45 permits attachment of the device 11 to a variety of disparate objects, such as, poles and the like having smooth rounded sides, trees having rough surfaces or a fluted column 68 as shown in FIG. 6 by providing the attachment 45 with a strap 66 as best shown FIG. 3. With the display support device 11 attached to the attachment 45 as described above, the assembly is strapped to the disparate object, such as column 68 as shown in FIG. 6. To tighten the strap 66, bottom portion 52 of the plunger 47, positioned for movement along the longitudinal axis 51 of the base 15, is forced away from the bottom side 65 of the attachment 45 by the rotatable member 21 pressing against the edge 55 of plunger 47 under action of the clamping arrangement. Thus, bottom portion 52 of the plunger 47, pressing against the column surface, acts to force the device 11 away from the column 68 to tighten the strap 66 and clasp the display support device 11 to the disparate object, regardless of the surface irregularity of the object. In addition, the bottom portion 52 of the plunger 47 can be made to form a soft pad, for example, made of a rubber material or the like, and having a high coefficient of friction, to prevent slippage between the device 11 and the disparate object, since the bottom portion is in contact with the disparate object. In addition, the bottom portion 52 of the plunger 37 can take the form of a suction cup.

Figure 8:
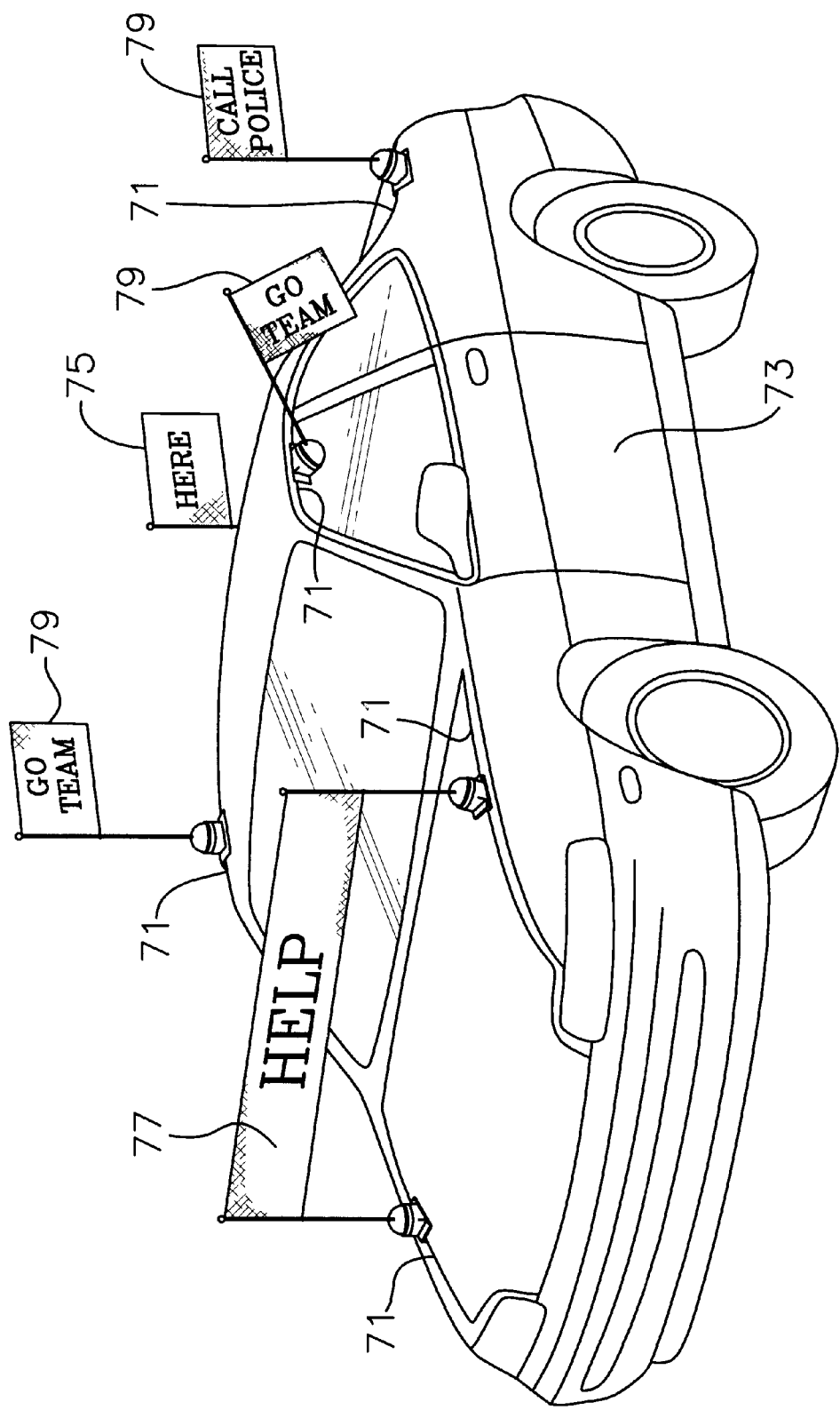
FIG. 8 is a perspective view illustrating the clipping attachment arrangement of FIG. 4 used to create various displays on an automobile.

The attachment 45 is also adaptable for use with a clipping arrangement as shown at 70 in FIG. 4. The clip 70 is slid onto a flange 74 for example of an automobile 73 as shown in FIG. 8. With the display support device 11 attached to the attachment 45 as described above, the assembly is clipped to a flange 74 of the disparate object, such as the automobile 73, as shown in FIG. 8. To tighten the clip 70, the plunger 47, positioned for movement along the longitudinal axis 51 of the base 15, is forced away from the bottom side 65 of the attachment 45 by the rotatable member 21 pressing against the edge 55 of plunger 47 under action of the clamping arrangement. Thus, the plunger 47, pressing against the flange surface 74, acts to force the device 11 away from the flange 74 to tightly grip the flange 74 between the clip 70 and the plunger 47 and clasp the display support device 11 to the disparate object. Typical flange surfaces 74 on an automobile can be found at the seam between the trunk lid and side panel, the hood and side panel, at the windows, as well as at the window frame, to cite a few examples.

Figure 4B:
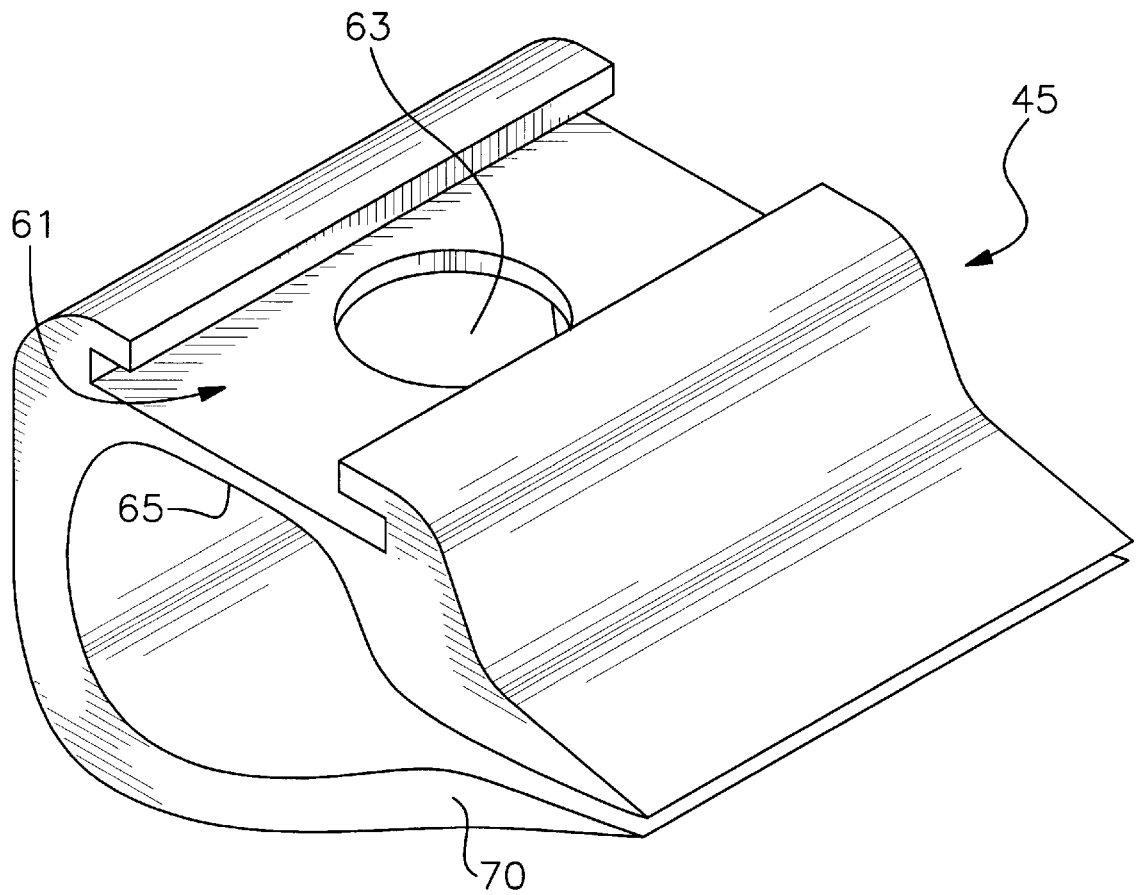
FIG. 4B is a perspective view of the spring clip of FIG. 4B.

Preferably, the clip 70 is a spring clip having a configuration such as shown in FIG. 4B, the clip 70 being made of a resilient material such as plastic or the like.

The display device 11 can be used for a number of different purposes including as a vehicle locator 75, a flag or banner support for a distress signal 77 as well as a display 79 for advertisement information, sports pennants or notice requirements as shown in FIG. 8. It should be noted that the shafts of the devices 11 can be positioned at almost any angle relative to the automobile 73.

Figure 9:
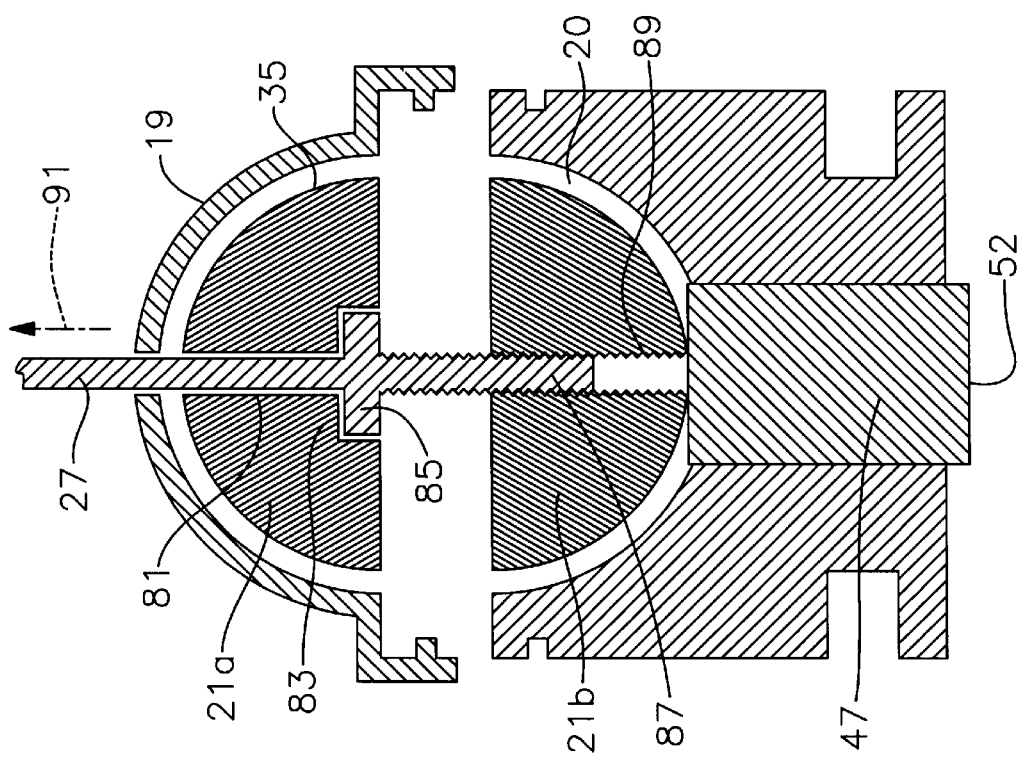

FIG. 9 illustrates a further embodiment of the clamping arrangement wherein the exterior surface 35 of the rotatable member 21 is expanded relative to the size of the cavity 20 to provide the requisite clamping action. In the arrangement of FIG. 9 the rotatable member 21 comprises two parts, 21a, 21b. Part 21a has a hole 81 for rotatably receiving shaft 27 and a stop surface 83 which abuts a stop 85 attached to shaft 27. The shaft 27 also has a threaded portion 87 which engages threaded hole 89 in portion 21b of the rotatable member. As shaft 27 is rotated in threaded hole 89 and moved in direction of arrow 91, stop 85 is pressed against stop surface 83 thereby forcing parts 21a and 21b apart to clamp rotatable member 21 against the cavity 20. The hollow shell 19 is rotatably mounted to the base 15 by a groove and tongue arrangement, generally seen at 80, wherein a tongue 82 is provided on the inner peripheral surface 84 of flange 86 of the shell 19; which is adapted to be received by a complementary groove 88 on the tipper, outer peripheral surface 90 of the base 15. When the rotatable member parts 21a, 21b are spread apart by the action of rotation of shaft 27, the force of the rotatable member parts 21a, 21b against the shell 19 prevents further rotation between the shell 19 and base 15 by jamming the tongue 82 and groove 88 against one another and creating an increased frictional force against further rotation.

Figure 10:
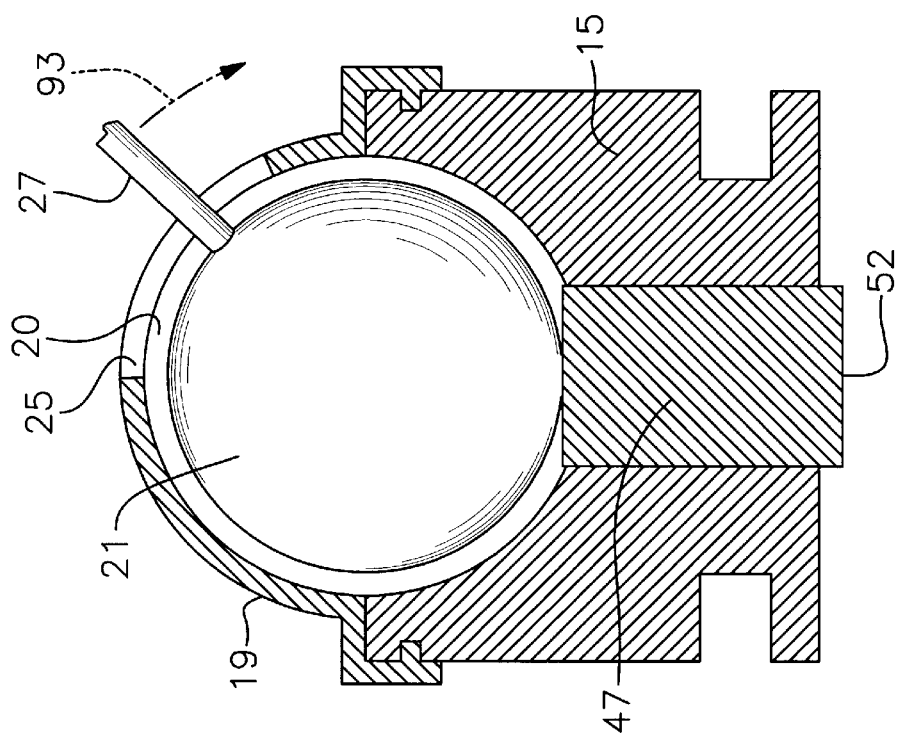
FIGS. 9 and 10 are cross-sectional views of further embodiments of the clamping arrangement of the present invention.

FIG. 10 illustrates yet another clamping arrangement wherein cavity 20 and rotatable member 21 are oblong to form a camming action to wedge the rotatable member 21 against the interior wall of the cavity 20 as the shaft 27 is slid along slot 25 in the direction of arrow 93. It should be noted that, as with the embodiment of FIG. 9, the shell 19 and base 15 are rotatably connected to one another by the tongue and groove arrangement, as generally shown at 80, which permits relative rotation between the shell 19 and base 15. The force of the rotatable member 21 pushing against shell 19 prevents further rotation between the shell 19 and base 15 by jamming the tongue 82 and groove 88 against one another and creating an increased frictional force against further rotation.

Figure 11:
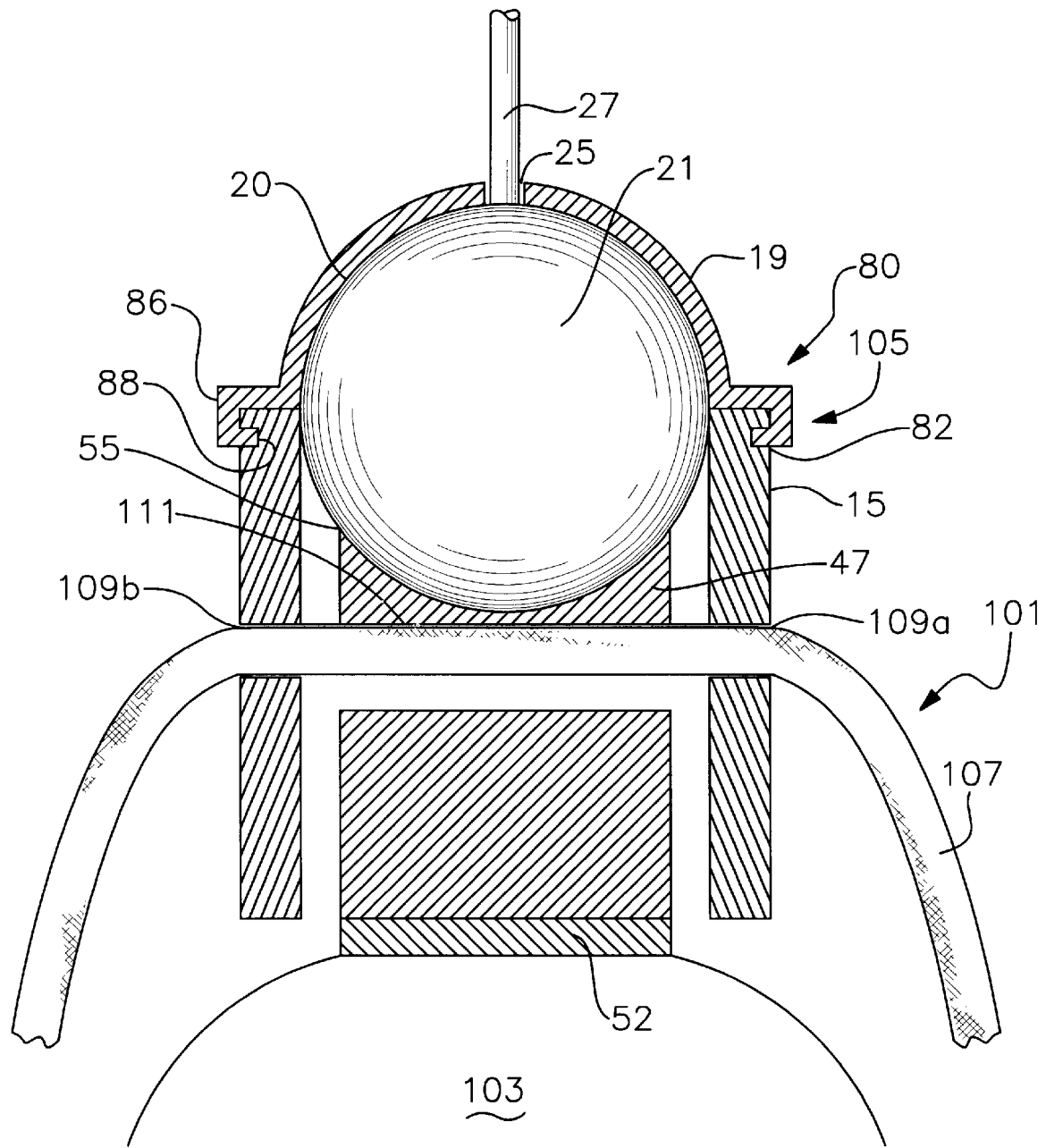
FIG. 11 illustrates a further embodiment of the present invention wherein a unique strap arrangement is attached to the device for attaching the device to a disparate object.

FIG. 11 illustrates yet another embodiment of the present invention wherein the present invention utilizes a unique strap attachment arrangement, generally indicated at 101, which cooperates with the display support device 11 to attach the device 11 to a disparate object 103. In the embodiment of FIG. 11, the display support device 11 comprises a hollow shell 19 which forms part of the cavity 20. The hollow shell 19 is rotatably mounted to the base 15 by the groove and tongue arrangement, generally seen at 80, as previously discussed with regard to the embodiments of FIGS. 9 and 10. The shell 19 further includes the provision of slot 25 through which extends the shaft 27 attached to the rotatable member 21 as previously described above. The rotatable member 21, received by the cavity 20, is freely rotatable in all directions as previously discussed above.

The plunger 47 has a length such that bottom 52 extends beyond the bottom of base 15. In addition, the one end 55 of the plunger 47 which abuts the rotatable member 21 has, for example, a shape which conforms to the shape of the rotatable member 21 so as to form a bottom wall of the cavity 20 and cradle the rotatable member 21. The other end 52 of the plunger 47 which contacts the disparate object 103 is provided with a soft rubber-like pad as previously described. A strap is attached to the base 15 by means of threading the strap 107 through openings 109a, 109b in the base 15. In addition, the plunger 47 is provided with an opening 111 through which the strap 107 is threaded, the opening 111 being positioned below the level of the opening 109a, 109b provided in the base 15 so that strap 107 exerts an upward force on the plunger 47 when the strap 107 is tightened around object 103.

Thus, when the strap 107 is tightened around the disparate object 103, the strap 107 pulls base 15 toward the object 103 and forces the plunger 47 toward the rotatable member 21 thereby clamping the rotatable member 21 between the hollow shell 19 and plunger 4 which is in contact with the disparate object 103 to thereby clamp the rotatable member 21 between the inside of the shell 19 and plunger 47 to prevent relative movement therebetween and to attach the display support device 11 to the disparate object. As noted above, the force of the rotatable member 21 against the shell 19 prevents further rotation between the shall 19 and base 15 by jamming tongue 82 and groove 88 against one another and creating an increased frictional force against further rotation.

Although the present invention has been described with particular reference to it preferred embodiments, it should be understood that many variations and modifications will now be obvious to those skilled in that art, and it is preferred therefore, that the scope of the invention be limited, not by the specific disclosure herein, but rather only by the appended Claims.

I claim:

1. A display support device comprising:
   a base having a longitudinal axis and a basin;
   a rotatable member received by the basin of the base for rotation in all directions about a single point of rotation;
   a shaft attached to the rotatable member for displaying a planar sheet material;
   a hollow shell, mounted to the base for rotation about the longitudinal axis thereof, for enclosing the rotatable member and for forming, with the basin of the base, a cavity in which the rotatable member is enclosed, the hollow shell having a slot extending along a portion thereof through which the shaft extends and a rim extending outwardly from the shell and contacting the base; and
   a clamping arrangement configured to clamp the rim against the end surface of the base, for preventing rotation of the rotatable member and the shell relative to the base.

2. A display support device according to claim 1, wherein the clamping arrangement comprises a threaded ring which fits over the shell and engages the rim thereof, the threaded ring having threads on an interior surface thereof which threadingly engage corresponding threads on the base;

wherein the cavity, formed by the basin of the base and the shell when the shell is completely attached to the base, is provided with a size smaller than the rotatable member; and wherein, when the threaded ring is screwed onto the base, the rim of the shell is clamped between the ring and the base to hold the shell stationary relative to the base and the shell is completely attached to the base so that the cavity presses against the rotatable member to clamp and hold stationary the rotatable member in the cavity.

3. A display support device according to claim 2, wherein the base further includes an opening for receiving at least one of a lawn spike or a pole.

4. A display support device according to claim 2, further comprising planar sheet material attachment means for removably attaching the planar sheet material to the shaft.

5. A display support device according to claim 4, wherein the planar sheet material attachment means comprises a tubular member integrally formed to the planar sheet material, the tubular member having an interior diameter substantially equal to and larger than a diameter of the shaft, a stop on the shaft for abutting one end of the tubular member to position the planar sheet material on the shaft, and a cap, removably attachable to a distal end of the shaft for retaining the planar sheet material on the shaft.

6. A display support device according to claim 2, further comprising:

a plunger mounted in an opening in the base for movement along the longitudinal axis of the base, the plunger having a top end which forms a portion of the basin and a bottom end which is adapted to contact a disparate object, the plunger having a length such that the bottom end of the plunger at least extends beyond a bottom surface of the base when the top end of the plunger is flush with the basin; and a strap for strapping the display support device to the disparate object, the strap arranged to be tightened as the bottom end of the plunger is moved away from the bottom surface of the base as the rotatable member presses against the top end of the plunger under the action of the clamping arrangement thereby causing the bottom end of the plunger to press against the disparate object and force the display support device away from the disparate object to tighten the strap.

7. A display support device according to claim 6, wherein the base is further provided with a removable base attachment for attaching the display support device to the disparate object.

8. A display support device according to claim 7, wherein the bottom end of the plunger extends beyond a bottom surface of the removable base attachment and the straps are attached to the removable base attachment.

9. A display support device according to claim 7, wherein the removable base attachment includes a clip for clipping the display support device to a flange surface of the disparate object, wherein, when the bottom end of the plunger is moved away from the bottom surface of the base by the rotatable member pressing against the top end of the plunger under the action of the clamping arrangement, the bottom end of the plunger is pressed against the flange surface of the disparate object to clasp the flanged surface and tightly clip the display support device to the disparate object.

10. A display support device according to claim 1, wherein the base is further provided with a removable base attachment for attaching the display support device to a disparate object.

11. A display support device according to claim 1 wherein the base includes wall attachment means for attaching the display support device to a wall.

12. A display support device according to claim 1, wherein the slot extends from a top of the hollow shell to the rim of the hollow shell so that, prior to clamping of the shell to the base, the shaft can be freely position at any desired angular position about the single point of rotation in a hemisphere extending above the rim of the shell by rotation of the shell relative to the base and movement of the shaft along the slot.

13. A display support device according to claim 1, wherein the shaft is removably attached to the rotatable member.

14. A display support device comprising:

a base having a longitudinal axis and a basin;

a rotatable member received by the basin of the base for rotation in all directions about a single point of rotation;

a shaft attached to the rotatable member for displaying a planar sheet material;

a hollow shell, mounted to the base for rotation about the longitudinal axis thereof, for enclosing the rotatable member and for forming, with the basin of the base, a cavity in which the rotatable member is enclosed, the hollow shell having a slot extending along a portion thereof through which the shaft extends and a rim which contacts the base; and a clamping arrangement for preventing rotation of the rotatable member and the shell relative to the base, wherein the clamping arrangement comprises means for increasing a size of the rotatable member relative to the cavity so that the rotatable member is wedged against an interior wall of the cavity preventing relative movement therebetween.

15. A display support device comprising:

a base having a longitudinal axis and a basin;

a rotatable member received by the basin of the base for rotation in all directions about a single point of rotation;

a shaft attached to the rotatable member for displaying a planar sheet material;

a hollow shell, mounted to the base for rotation about the longitudinal axis thereof, for enclosing the rotatable member and for forming, with the basin of the base, a cavity in which the rotatable member is enclosed, the hollow shell having a slot extending along a portion thereof through which the shaft extends and a rim which contacts the base; and a clamping arrangement for preventing rotation of the rotatable member and the shell relative to the base, wherein the clamping arrangement comprises providing the rotatable member and the cavity with an egg-shape so that as the rotatable member is rotated transversely to the longitudinal axis of the basin of the base, a clamping action causes the rotatable member to be wedged in the cavity preventing relative movement therebetween.

16. A display support device comprising:

a base having a longitudinal axis;

a plunger mounted in an opening in the base for movement along the longitudinal axis of the base, the plunger having a top end which forms a basin and a bottom end which is adapted to contact a disparate object;

a rotatable member received by the basin of the plunger for rotation in all directions about a single point of rotation;

a shaft attached to the rotatable member for displaying a planar sheet material;

a hollow shell, mounted to the base for rotation about the longitudinal axis thereof, for enclosing the rotatable member and for forming, with the basin of the plunger, a cavity in which the rotatable member is enclosed, the hollow shell having a slot extending along a portion thereof through which the shaft extends and a rim which engages a periphery of the base; and a clamping arrangement for preventing rotation of the rotatable member and the shell relative to the base, wherein the clamping arrangement comprises:
  an opening in the plunger which extends substantially transversely of the longitudinal axis of the base;
  a pair of openings in opposite sides of the base; and
  a strap threaded through the opening in the plunger and the pair of openings in the base;
  wherein the opening in the plunger is positioned closer to the bottom surface of the base than the pair of openings in the base so that when the strap is tightened, the plunger is forced toward the hollow shell thereby clamping the rotatable member between the hollow shell and the plunger to prevent relative movement therebetween.

17. A display support device according to claim 16, wherein the hollow shell is mounted to the base for rotation about the longitudinal axis thereof by a tongue and groove arrangement.

18. A display support device according to claim 16, wherein the slot extends from a top of the hollow shell to the rim of the hollow shell so that, prior to clamping of the shell to the base, the shaft can be freely position at any desired angular position about the single point of rotation in a hemisphere extending above the rim of the shell by rotation of the shell relative to the base and movement of the shaft along the slog.

19. A display support device according to claim 16, wherein the shaft is removably attached to the rotatable member.

* * * * *